Nov. 21, 1939.   D. H. REED   2,180,693
INSIDE PIPE CUTTER
Filed Feb. 19, 1935
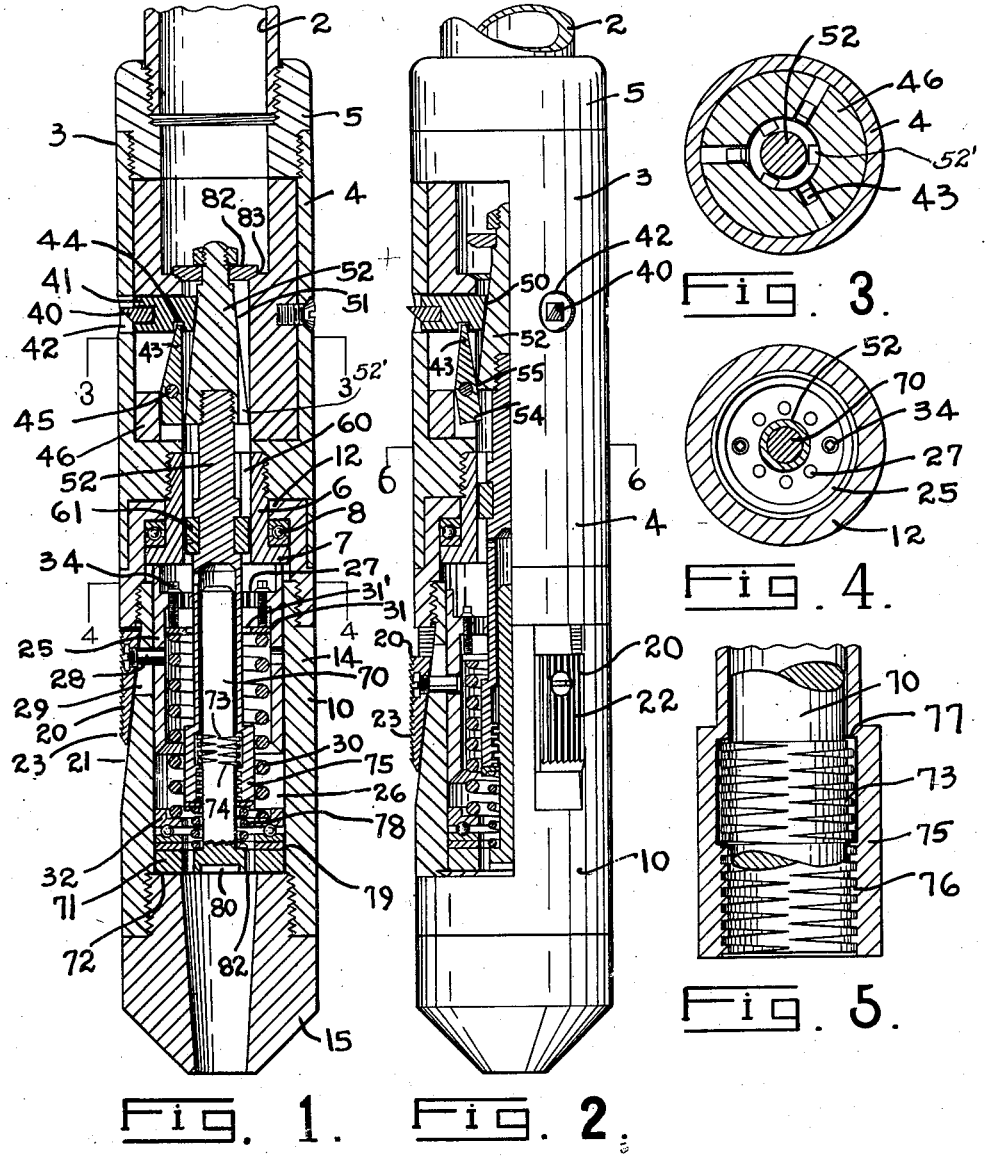
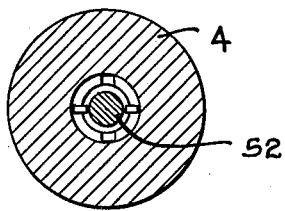
DEMPSON H. REED.
INVENTOR.
BY Jesse R. Stone
Lester B. Clark
ATTORNEYS.

Patented Nov. 21, 1939

2,180,693

UNITED STATES PATENT OFFICE 2,180,693

INSIDE PIPE CUTTER

Dempson H. Reed, Houston, Tex.

Application February 19, 1935, Serial No. 7,175

13 Claims. (Cl. 164—0.4)

The invention relates to inside pipe cutters and particularly of the type wherein the cutting action of the blades can be controlled by the operator.

The cutting of pipe inside of wells where the condition and positioning of the pipe is not known and where mud and abrasive are present is a difficult job at best. It is therefore necessary that a cutter be provided wherein the rate of advancement of the cutting blades must be accurately controlled so that they will not take too great a bite on the pipe and so that the adjustment of the cutters can be retarded in accordance with the conditions encountered.

With the foregoing conditions in mind it is one of the objects of the invention to provide a cutting tool wherein a differential drive mechanism is provided so that adjustment of the cutters will be retarded when excessive resistance is encountered.

Another object of the invention is to provide a cutting tool wherein the pressure causing advancement of the cutters can be controlled by the operator and applied in a manner to obtain the proper cutting action.

Another object of the invention is to provide a cutting tool wherein the cutter blades will be extended and retracted and the operator advised when the blades have reached their retracted position as an indication of the fact that the cut has been completed and the blades retracted so that the tool may be removed.

Another object of the invention is to provide a cutting tool wherein the tool is anchored to the pipe being cut, and a variable driving connection is provided in combination with the anchoring means.

It is also an object of the invention to provide a differential drive which does not advance the cutters upon rotation of the tool except when a preponderance of pressure is applied in accordance with the resistance encountered.

Another object of the invention is to provide a pressure operated screw feed for pipe cutters.

Another object of the invention is to provide a mounting so that the cutter blades may be readily replaceable.

Still another object of the invention is to provide a screw feed for pipe cutting blades which may be varied by both mechanical and fluid pressures.

Still another object of the invention is to provide a screw head and cutter blades so that the blades will be advanced and retracted by the continuous rotation of the tool in one direction.

Other and further objects of the invention will be readily apparent when the following description is considered in connection with the accompanying drawing wherein:

Fig. 1 is a central, vertical section of the tool in assembled condition prior to its adjustment for being positioned in the well.

Fig. 2 shows a view somewhat similar to Fig. 1 but partly in elevation and illustrating the positioning of the parts when the tool is anchored and the blades being advanced to cutting position.

Figs. 3 and 4 are sections taken on the lines 3—3 and 4—4 of Fig. 1, respectively.

Fig. 5 is a vertical section of the lower part of the driving mandrel in combination with the driving stem and illustrating the manner of the advancing and retracting threaded connections.

Fig. 6 is a section taken on the line 6—6 of Fig. 2.

As is the usual practice, a cutting tool of the type herein described, is lowered into the well bore by means of a string of pipe 2. This pipe extends to the surface and is rotated in order to impart rotation to the cutting tool which is indicated generally at 3. This tool is made up of a body 4 which is connected to the coupling 5 and which is in turn connected to the pipe 2, threaded connections having been shown. This body 4 at its lower end has the nipple 6 connected therewith which has a head 7 to receive the bearing 8 so that a swivel connection is provided between the body 4 and the anchor 10, the bearing 8 being confined between the head 7 on the body and the head 12 on the anchor 10.

The anchor 10 includes a housing 14 for the driving mechanism and carries the guide point 15 which directs the tool into the pipe which is to be cut.

In order that the tool may be securely anchored so that there may be relative rotation between the body 4 and the anchor 10 a set of slips 20 have been mounted on the beveled faces 21 of the anchor 10. The slips may take any desired form and number, the present illustration showing vertical teeth 22 on some of the slips and transverse teeth 23 on other of the slips, so that the anchor 10 will be securely fixed in the casing, both as to vertical and longitudinal movement because of the two types of teeth 22 and 23.

It is intended that the slips 20 will be set to engage the pipe by applying fluid pressure through the pipe 2, the housing 4 and the anchor 10. This pressure will be applied to the piston 25 which is slidably mounted in the chamber 26 in the anchor 10. This piston 25 is provided with a plurality of restricted openings 27 so that when fluid pressure is applied thereto the piston will be caused to move downwardly when the pressure exceeds the flow of fluid which can pass through the openings 27. The slips 20 are carried by the piston 25 by means of the pins 28 which are arranged to move in the slots 29 in the anchor housing 14.

Fig. 1 shows the slips in retracted position whereas Fig. 2 shows the slips in pipe engaging position with the piston 25 depressed.

In order that the piston 25 will normally remain in the position of Fig. 1 a heavy coil spring 30 has been positioned in the chamber 26 and is confined between the control disc 31 which is positioned in the piston 25 and the pressure bearing 32 which is also in the chamber 26. The initial tension on this spring tending to support the piston 25 can be adjusted by means of the set screws 34, a plurality of which are threaded through the head of the piston and engaged against the pressure disc 31. It seems obvious that springs of various strengths may be used in accordance with the original pressure which is desired. The pressure of the spring is effective in the controlled driving of the cutter blades as will be later explained.

When the tool is to be anchored in the pipe pressure is applied through the operating pipe 2 so as to cause the piston to depress and the slips 20 to be moved downwardly on the beveled faces 21. When the slips have engaged the pipe which is to be cut an upward pull on the operating string 2 tends to securely anchor the slips in position so that the anchor portion 10 of the tool is thereafter immovable and serves as an anchor for the driving mechanism of the cutters and to also insure that the cutter blades will be maintained at the same elevation during the cutting operation.

The cutter blades 40 are seen in Figs. 1 and 2 and these blades are carried by a cutter head 41 which is arranged to be extended and retracted through an opening 42 in the body 4. It should be particularly noted that each of the cutter heads 41 is mounted on an upstanding arm 43 which projects into an opening 44 in the cutter head. This arm 43 is pivoted at 45 to the cutter block 46 which is mounted in the body 4. The arm 43 is free to pivot in accordance with the radial movement of the cutter head 41. The rear end 50 of each of the cutter heads 41 is arranged to abut against the inclined surface 51 of the driving mandrel 52, so that when the mandrel is raised it will drive the cutter head 41 and the cutter 40 outwardly.

Fig. 2 shows the cutter partly extended with the mandrel 52 partly raised. It will be seen that the arm 43 has tilted somewhat in a counterclockwise direction about its pivot 45 so that the heel 54 thereof has moved in beneath the corner 55 of the head of the mandrel 52. When, however, the cutting operation has been completed and the head of the mandrel is lowered the corner 55 will bear against the heel 54 and cause it to move outwardly which will, of course move the upper end of the arm 43 inwardly and in this manner retract the cutter.

A particular advantage of this arrangement of the cutter head 41, mandrel 52 and arm 43, is that when the mandrel is raised to its uppermost limit that it is possible to remove the cutter head 41 from the tool because the arm 43 will tilt outwardly a sufficient distance to allow its upper end to move out of the groove 44. Thus when the tool is being repaired or reserviced for future use the cutters may be readily replaced by merely running the mandrel to its uppermost position. This is of material advantage over the prior devices wherein the entire tool had to be disassembled in order to replace the cutters.

The driving mechanism for the device includes the longitudinal slots 60 in the nipple 6 which receive the drive lugs 61 which are positioned in the side of the mandrel 52. This provides a slidable but non-rotatable connection between the body 4 and the mandrel 52.

The head portion of mandrel 52 is provided with a plurality of grooves or passages 52' intermediate the positions of cutter heads 41 and fingers 43. Since fluid is pumped through the tool when in operation, as hereafter described, this construction minimizes throttling effect at this point and also reduces abrasive action upon the surfaces which have sliding engagement with arms 43 and cutter heads 41.

A drive stem 70 is mounted in the anchor housing 10 and includes a base portion 71 which is arranged to seat on a shoulder 72 in the anchor portion of the device. Relative rotation of the mandrel 52 and this stem 70 causes the cutters to advance or retract. Such relative rotation is effected by differential pressure as will be later described. It is intended that this head 71 will normally engage against the shoulder 72.

The stem 70 is threaded at 73 with a double acting reversible thread of a type well known. It should be noted, however, that only a portion 74 of the stem is so threaded and that this portion is spaced from the head 71 a predetermined distance.

The lower end 75 of the mandrel 52 is hollow and is threaded at 76 in a manner to pass over the threaded portion 74 of the stem 70. The inside of this head 75 is best seen in Fig. 5 and contains the threads 76 to mesh with the threads 73 on the stem 70. Upon relative rotation of the mandrel and the stem in a clockwise direction the head 75 will travel upwardly because these threads will be started into engagement when the tool is set. The shoulder 77 is provided in the head 75 to be engaged by the uppermost of the threads 73 at the time the lowermost thread passes the uppermost thread 76. This causes the opposite sides of the threads to engage and the mandrel to reverse its direction and move downwardly. The cutters are extended and retracted by this movement.

In order to insure that there may be a constant pressure against this head 75 to again reverse its direction at the bottom of the movement a small retainer spring 78 has been provided between the lower end of the head on the mandrel and the head 71 on the stem as best seen in Fig. 1. The rings 79 are positioned between the bearing 32 and the head 71 so that proper spacing of the parts may be had. If the friction of the engagement of the threads 73 and 75 is greater than the tendency of the head 71 to remain stationary because of its seat on the shoulders 72, then the stem 70 will rotate with the mandrel and there will be no advancement of the cutters.

In order to adjust the tool for operation a slot 80 has been provided in the base of the head 71. A screw driver may be inserted in this slot to turn the stem 70 with respect to the mandrel 52 until the threads 73 and 76 are just started into engagement. This movement will tend to raise the valve 82 from its seat 83 in the cutter block 46. With this valve slightly open and the threads just barely engaged the tool is then ready to be inserted in the well. When it arrives at the proper elevation the pump pressure will be applied to the fluid in the pipe so that it will pass downwardly around the valve 82, around the mandrel 52, and into the top of the chamber 26. It will then be forced through the openings 27 which is the first major restriction encountered. As the pressure builds up on the piston 25 above the openings 27 the piston will be forced downwardly to move the slips 20 outwardly and the tool can then be anchored by a slight pull upward on the pipe 2 to set the slips against the face of the pipe which is to be cut.

The downward movement of the piston 25 also increases the compression of the spring 30 so that a greater pressure is applied to the bearing 32 and the head 71 so that there will be a tendency for the head 71 to remain stationary along with the anchor 10. With the parts in this position the pipe 2 and the body 4 will be rotated; the pump pressure may be maintained or may be reduced as the operator desires in accordance with his practice or the circulation may be continued to wash away any matter remaining inside of the pipe which is to be cut.

When the operator is ready to begin the cutting operation it is only necessary for him to rotate the stem 2. This rotation is imparted to the mandrel 52 by the lugs 61 so that the threads 76 are caused to bear against the threads 73 on the threaded portion 74 of the stem 70.

The compression on the spring 30 will be so adjusted by the set screws 34 and the pump pressure applied by the liquid passing through the openings 27 in the piston 25 that the contact of the threads will not be overcome by the resistance to rotation of the head 71 on the shoulder 72 and the driving mechanism will rotate as a unit. When the operator believes that his tool is properly anchored and the parts functioning then he will increase the pump pressure to further depress the pressure plate 31 and increase the compression on the spring 30 and consequently of the head 71 against the shoulder 72. When this resistance to rotation of 71 on 72 increases to where it exceeds that of the threaded portions the stem 70 may continue to rotate but will drag behind the mandrel so that there will be some relative rotation to cause some upward movement of the mandrel. This differential pressure causes the advancement of the cutters. If the resistance to cutting should increase because the cutters were feeding forward too fast or for any other reason the advancement would cease just as soon as the differential pressure is equaled or exceeded. The less resistance encountered by the cutters the faster they will be advanced because the balance of pressure would be thrown against the head 71. In other words a very fine and accurate control may be had of the cutters and they instantly react to any upset in the balance of pressure to either advance faster or to cease advancing at all dependent on the circumstances encountered.

If the operator rotates his spring of pipe a greater number of turns than there are threads in the head 75 then he is aware of the fact that the cutters have not been driven immediately into the pipe but that he must apply a greater pressure to obtain sufficient differential to effect driving. There is, however, no positive unyielding force applied to the cutters but only a differential pressure which may be overcome and the cutters cease to advance when conditions change.

When the differential pressure has caused the threads 76 to travel to the top of the threads 73 the shoulder 77 will be engaged to shift the contact faces of the threads and the reverse movement will occur to retract the cutters. When the cutters are fully retracted the valve 82 will seat and cut off the flow of liquid. This results in stalling of the pumps and the operator is aware of what has occurred and that his cutters are retracted. The tool may then be moved to perform another cut as it is only necessary to anchor the tool again and continue rotating. The small spring 78 tends to cause reversal of the contact faces of the threads and the mandrel will again start upwardly dependent upon the amount of differential pressure.

In many instances the tool may not be entirely centered within the pipe. The pipe may be corroded or bent so that there is no uniform cutting action of the several cutters and there may be materials adhering to the pipe so that it is very uncommon that a uniform cutting action is obtained by the blades. In some instances the blades are fed outwardly faster than the cutting action is performed so that they bite or gouge into the pipe. If a positive unyielding driving action were imparted to the cutters they would break very frequently. With the present tool, however, a yielding or compensating drive has been provided because of the differential action which occurs. Thus if one of the cutters should gouge into the pipe or excessive resistance to rotation should occur, this resistance will be transmitted down the mandrel 52 to the threads 73 and 76, which increase in pressure will tend to rotate the head 71 with the mandrel 52 and thus reduce the driving action as a function of the resistance encountered.

With the foregoing arrangement the operator may apply such pressure as desired to the device in order to perform the cutting operation. If he desires to increase the pressure of his pumps a material amount the pressure will also build up in the chamber 26 below the pressure plate 31 because of the restricted orifices 82 in the head 71. These orifices will be smaller than the passages 27 or 31' so that the operator can build up an additional pressure on the bearing 32 to be applied against the head 71.

The very fine control obtained by the differential balance of pressure results in an operation of the cutter tool which has been heretofore impossible.

The feature of advantage in having the slips 20 capable of operation by fluid pressure is that in event the cut cannot be completed the fluid pressure may be released and upon a slight downward movement of the entire tool the slips will be released because of the pressure of the spring 30. This can be accomplished after the cutters have been retracted. It is also desirable to remove the cut-off piece of pipe at the same time the cutter tool is removed from the well. With the present tool it is only necessary to release the tool and raise it to the proper elevation so that the slips 20 will be located in the cut-off portion of the pipe. Fluid pressure can then be applied to the tool to reset the slips 20 inside of the cut-off piece of pipe, or as it is generally termed in the field the "fish." Once the slip has been set in the fish a considerable pull may be exerted with this cutting tool the same as any spear or other instrument which is lowered into well and into the fish for the purpose of removing it from the well. The re-setting of the slips 20 permits the use of the tool in making a plurality of cuts at different elevations, without removing the tool from the well.

What is claimed is:

1. An inside pipe cutter comprising cutter blades, a cutter support adapted to be anchored in the well, a cutter body swiveled to said support, a mandrel positioned to engage said cutter blades and to rotate with said cutter body to advance and retract the cutter blades upon rotation of said body, and means to advance and then retract said mandrel upon relative rotation of said body and support in one direction.

2. An inside pipe cutter comprising a cutter support adapted to be anchored in the well, a cutter body swiveled to said support, cutter blades on said body, a mandrel positioned to rotate with said cutter body to engage and advance and retract the cutter blades upon rotation of said body, means to advance and then retract said mandrel upon relative rotation of said body and support in one direction, said means including a contact with said support.

3. An inside pipe cutter comprising a cutter support adapted to be anchored in the well, a cutter body swiveled to said support, cutter blades carried by said body, a mandrel positioned to rotate with said cutter body, means on the mandrel connected to said body to advance and retract the cutter blades upon rotation of said body, means to advance and then retract said mandrel upon relative rotation of said body and support in one direction, said means including a contact with said support adapted to drive only when a predetermined pressure is applied thereto.

4. An inside pipe cutter including an anchor, a drive stem, coengaging surfaces on said stem and anchor adapted for sliding contact, a rotatable mandrel to be advanced by said stem, cutter blades, means to be advanced by the mandrel to move said blades, and means to apply pressure to said stem so that it has a tendency to drag behind said mandrel during rotation thereof because of the friction on said surfaces, and means to advance the mandrel in proportion to the amount of drag.

5. A pipe cutter including an anchor, a stem therein, cutter blades, a mandrel to advance said blades, a threaded connection between said stem and mandrel to cause advance of the cutters upon relative rotation of said stem and mandrel, which are normally arranged to rotate together, and means to cause said stem to lag behind said mandrel during rotation whereby the cutter blades will be advanced in proportion to the lag.

6. A pipe cutter including an anchor, a stem rotatably mounted therein, cutter blades, means to advance said blades, a threaded connection between said stem and means to cause advance of the cutters upon relative rotation of said stem and means, which are normally arranged to rotate together, and additional means to cause said stem to lag behind said means during rotation whereby the cutter blades will be advanced in proportion to the lag, said additional means including a spring to apply pressure.

7. A pipe cutter including an anchor, a stem therein, cutter blades, means to advance said blades, a threaded connection between said stem and means to cause advance of the cutters upon relative rotation of said stem and means, which are normally arranged to rotate together, and additional means to cause said stem to lag behind said means during rotation whereby the cutter blades will be advanced in proportion to the lag, said additional means including a piston adapted to be moved by fluid pressure.

8. A pipe cutter including an anchor, a stem therein, cutter blades, means to advance said blades, a threaded connection between said stem and means to cause advance of the cutters upon relative rotation of said stem and means, which are normally arranged to rotate together, and additional means to cause said stem to lag behind said means during rotation whereby the cutter blades will be advanced in proportion to the lag, said additional means including a fluid pressure operable piston and a spring arranged for adjustment to vary the pressure on said stem.

9. In a cutter drive mechanism for pipe cutters an anchor, a drive stem rotatably disposed therein, a stationary spring in said anchor to apply pressure to said stem tending to prevent rotation, a rotatable mandrel threaded on the stem and adapted to normally overcome the resistance of said spring to rotate said stem, and means to increase the pressure of said spring so that the differential force thus obtained results in a slower rotation of said drive stem.

10. A pipe cutter including an anchor and cutter members carrying cutters, a coengaging threaded member carried by each said anchor and a cutter member, and fluid pressure operated means to control the relative movement of said coengaging members as a function of the resistance encountered by the cutters and one of the threaded members when opposed by the fluid pressure applied to the pipe cutter.

11. In a cutter drive mechanism for rotatable pipe cutters, a driving connection for said cutters, said connection being constructed and arranged so that the cutters are advanced and thereafter retracted by continuous rotation of said driving connection, and including a stem with reversed threads thereon enmeshing with complementary means rotatable with said cutters.

12. In a pipe cutter tool, a body, cutter heads movable in said body, fingers pivoted in said body adjacent said cutter heads and interconnected with said cutter heads, a tapered mandrel movable within said body to move said heads outwarly and having a portion to abut said fingers to retract said heads, said tapered mandrel having passages therein whereby throttling and abrasion are minimized.

13. In a cutter drive mechanism for rotatable pipe cutters, cutter heads, a tapered mandrel for advancing and retracting said cutter heads, said mandrel having a sleeve portion thereon, a drive stem extending into said sleeve portion and intermeshing means on said stem and sleeve, said means being shaped to be engageable by relative rotation of said stem and sleeve and to be disengaged by a continuation of relative rotation in the same direction whereby the cutter heads are advanced and retracted.

DEMPSON H. REED.